United States Patent
Kotelnikova (10) Patent No.: US 11,507,249 B2
(45) Date of Patent: Nov. 22, 2022

(54) METHOD AND APPARATUS FOR PINNING A LEVEL WITHIN A BREADCRUMB FOR USE IN NAVIGATING BETWEEN BREADCRUMBS

(71) Applicant: CISCO TECHNOLOGY, INC., San Jose, CA (US)

(72) Inventor: Anna Kotelnikova, Albuquerque, NM (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/138,140

(22) Filed: Dec. 30, 2020

(65) Prior Publication Data

US 2022/0206670 A1 Jun. 30, 2022

(51) Int. Cl.
| | | |
|---|---|---|
| G06F 3/048 | (2013.01) | |
| G06F 3/04817 | (2022.01) | |
| G06F 16/25 | (2019.01) | |
| G06F 3/0484 | (2022.01) | |

(52) U.S. Cl.
CPC ........ *G06F 3/04817* (2013.01); *G06F 3/0484* (2013.01); *G06F 16/252* (2019.01)

(58) Field of Classification Search
CPC ... G06F 3/04817; G06F 16/252; G06F 3/0484
See application file for complete search history.

(56) References Cited

U.S. PATENT DOCUMENTS

| | | | |
|---|---|---|---|
| 9,576,046 B2* | 2/2017 | Bullotta | G06F 16/252 |
| 10,025,880 B2* | 7/2018 | Bullotta | G06F 16/252 |
| 2005/0166157 A1 | 7/2005 | Ollis | |
| 2006/0123361 A1 | 6/2006 | Sorin | |
| 2006/0242604 A1* | 10/2006 | Wong | G06F 16/168 715/854 |
| 2009/0063547 A1 | 3/2009 | Wright | |
| 2013/0111404 A1* | 5/2013 | Yang | H04L 67/1097 715/811 |
| 2016/0210268 A1* | 7/2016 | Sales | G06F 3/04842 |
| 2017/0075535 A1 | 3/2017 | Heasman | |
| 2017/0285889 A1 | 10/2017 | DeMaris | |
| 2019/0129594 A1* | 5/2019 | Tamura | G06F 16/185 |

OTHER PUBLICATIONS

"About the Microsoft 365 admin center," Microsoft, https://web.archive.org/web/20201112043152/https://docs.microsoft.com/en-us/microsoft-365/admin/admin-overview/about-the-admin-center?view=o365-worldwide, Aug. 28, 2020, 4 pages.
"Admin Guide," Ring Central, 2019, 292 pages.
"Jira Software," Atlassian, https://web.archive.org/web/20201229145002/https://www.atlassian.com/software/jira, Dec. 29, 2020, 13 pages.

* cited by examiner

*Primary Examiner* — David E Choi (57) ABSTRACT

In one embodiment, a method includes navigating through levels in a breadcrumb path in a hierarchical dataset comprising a plurality of breadcrumb paths with a plurality of the levels, pinning a level within the breadcrumb path, navigating directly to the pinned level in another breadcrumb path, unpinning the pinned level, and navigating through the levels in one of the breadcrumb paths. An apparatus and logic are also disclosed herein.

20 Claims, 10 Drawing Sheets

Users

All 169 Administrators | Partner Administrators 25

| First Name | Last Name | Display Name | Em |
|---|---|---|---|
| Bruce | Banner | Bruce Banner | bba |
| Bucky | Barnes | Bucky Barnes | bba |
| Clint | Barton | Clint Barton | cba |
| Drax | The Destroyer | Drax | dra |
| Gamora | Gamora | Gamora | gam |
| Groot | Tree | Groot | gro |
| James | Rhodes | James Rhodes | jrh |
| Loki | Laufeyson | Loki | lok |
| Natasha | Romanoff | Natasha Romanoff | nro |
| Peter | Parker | Peter Parker | ppa |
| Peter | Quill | Peter Quill | pqu |
| Stephen | Strange | Stephen Strange | pqu |
| Steve | Rogers | Steve Rogers | sro |
| Thor | Odinson | Thor | thor |
| Tony | Stark | Tony Stark | tsta |

52 —

Clint Barton ✎
cbarton@avengers.com                                  ✕

User                                                  Edit
Services
  ⊙ Message                                    Message  >
  ⊙ Meetings                        Cisco Webex Meetings  >
  ⊙ Calling                       Webex Calling Basic  >

Roles and Security
  ⊙ Roles and Security                                >

Devices
  ⊛ Cisco 7841                                        >
  ⊛ Cisco 8345                                        >
  ⊛ Cisco 8865       [Activating]                     >

Locations                                          Manage ⧉
Avengers Headquarters

FIGURE 5

| Users | | | |
|---|---|---|---|
| 🔍 All 169  Administrators  Partner Administrators 25 | | | |
| First Name | Last Name | Display Name ⌄ | Em |
| Bruce | Banner | Bruce Banner | bba |
| Bucky | Barnes | Bucky Barnes | bba |
| Clint | Barton | Clint Barton | cba |
| Drax | The Destroyer | Drax | dra |
| Gamora | Gamora | Gamora | gam |
| Groot | Tree | Groot | gro |
| James | Rhodes | James Rhodes | jrh |
| Loki | Laufeyson | Loki | lok |
| Natasha | Romanoff | Natasha Romanoff | nro |
| Peter | Parker | Peter Parker | ppa |
| Peter | Quill | Peter Quill | pqu |
| Stephen | Strange | Stephen Strange | pqu |
| Steve | Rogers | Steve Rogers | sro |
| Thor | Odinson | Thor | thor |
| Tony | Stark | Tony Stark | tsta |

Clint Barton ✎ ✕
cbarton@avengers.com  ⊙ Pin 📌 —68

User > Calling > Advanced
Advanced Call Settings

Applications  ⌃ ⌄
Barge In  On ⌄
Calling Permissions  On ⌄
Call Recordings  Off ⌄
Compression Options  Normal ⌄
Monitoring  ⌃ ⌄
Privacy  ⌃ ⌄
Push To Talk  ⌄
User Intercept  Off ⌄

Users

All 169 Administrators 25 | Partner Administrators

| First Name | Last Name | Display Name | Em... |
|---|---|---|---|
| Bruce | Banner | Bruce Banner | bba |
| Bucky | Barnes | Bucky Barnes | bba |
| Clint | Barton | Clint Barton | cba |
| Drax | The Destroyer | Drax | dra |
| Gamora | Gamora | Gamora | gam |
| Groot | Tree | Groot | gro |
| James | Rhodes | James Rhodes | jrh |
| Loki | Laufeyson | Loki | lok |
| Natasha | Romanoff | Natasha Romanoff | nro |
| Peter | Parker | Peter Parker | ppa |
| Peter | Quill | Peter Quill | pqu |
| Stephen | Strange | Stephen Strange | pqu |
| Steve | Rogers | Steve Rogers | sro |
| Thor | Odinson | Thor | thor |
| Tony | Stark | Tony Stark | tsta |

Clint Barton ✎
cbarton@avengers.com

○ Pin — 68

72 —

User > Calling > Advanced > Barge in

Barge In

Allow site users to drop in on an ongoing call, essentially creating a 3-way call among all parties.

| Users | | | |
|---|---|---|---|
| 🔍 All 169  Administrators  Partner Administrators 25 | | | |
| First Name | Last Name | Display Name ∨ | Em |
| *Bruce* | *Banner* | *Bruce Banner* | *bbn* |
| Bucky | Barnes | Bucky Barnes | bba |
| Clint | Barton | Clint Barton | cba |
| *Drax* | *The Destroyer* | *Drax* | *dra* |
| *Carnora* | *Carnora* | *Carnora* | *gam* |
| Groot | Tree | Groot | gro |
| *James* | *Rhodes* | *James Rhodes* | *jrh* |
| Loki | Laufeyson | Loki | lok |
| *Natasha* | *Romanoff* | *Natasha Romanoff* | *nro* |
| Peter | Parker | Peter Parker | ppa |
| Peter | Quill | Peter Quill | pqu |
| Stephen | Strange | Stephen Strange | pqu |

80 ─┐

Groot Tree ✎   ✕
gtree@avengers.com

84a ─┐   86 ─┐
∧ ∨  11 of 98 ── 84b      ○ Barge In is pinned. Unpin 📌

Barge In
Allow site users to drop in on an ongoing call, essentially creating a 3-way call among all parties. ── 87

Barge In Warning Tone
☑ Play a tone when users barge in

METHOD AND APPARATUS FOR PINNING A LEVEL WITHIN A BREADCRUMB FOR USE IN NAVIGATING BETWEEN BREADCRUMBS

TECHNICAL FIELD

The present disclosure relates generally to navigating within a hierarchy of data, and more particularly, to pinning within a breadcrumb.

BACKGROUND

Editing or comparing one or more pieces of information for multiple items in a list or table can be cumbersome. This is especially true when the information is nested several levels deep within a hierarchy.

BRIEF DESCRIPTION OF THE DRAWINGS

Corresponding reference characters indicate corresponding parts throughout the several views of the drawings.

DESCRIPTION OF EXAMPLE EMBODIMENTS

Overview

In one embodiment, a method generally comprises navigating through levels in a breadcrumb path in a hierarchical dataset comprising a plurality of breadcrumb paths with a plurality of the levels, pinning a level within the breadcrumb path, navigating directly to the pinned level in another breadcrumb path, unpinning the pinned level, and navigating through the levels in one of the breadcrumb paths.

In one or more embodiments, pinning the level within the breadcrumb path comprises receiving input at a pin icon (e.g., clickable icon that serves as a button) of a graphical user interface, wherein the pin icon is displayed at each of the levels except for a first level.

In one or more embodiments, navigating directly to the pinned level in the breadcrumb path comprises receiving input at a navigational arrow displayed on a graphical user interface upon pinning the level.

In one or more embodiments, the method further comprises displaying a list of the breadcrumb paths without displaying the levels within each of the breadcrumb paths, wherein a first level is displayed upon selecting one of the breadcrumb paths. One or more of the breadcrumb paths not containing the pinned level in the list of the breadcrumb paths may be disabled. Navigating directly to the level in the breadcrumb path may comprise skipping the breadcrumb paths not containing the pinned level.

In one or more embodiments, a list of the breadcrumb paths may be displayed in a primary window and each of the levels displayed in side panel.

In one or more embodiments, input changing a setting at the pinned level in two or more of the breadcrumb paths may be received before unpinning the level.

In one or more embodiments, all of the breadcrumb paths may be reduced to the pinned level.

In another embodiment, an apparatus generally comprises memory for storing a hierarchical dataset comprising a plurality of breadcrumb paths comprising a plurality of levels, a graphical user interface for displaying a list of the breadcrumb paths, and a controller operable to navigate through the levels in one of the breadcrumb paths, pin a level within the breadcrumb path, navigate directly to the pinned level in another breadcrumb path, and unpin the pinned level in response to input received at the graphical user interface.

In yet another embodiment, logic is encoded on one or more non-transitory computer readable media for execution and when executed operable to navigate through levels in a breadcrumb path in a hierarchical dataset comprising a plurality of breadcrumb paths with a plurality of the levels, pin a level within the breadcrumb path, navigate directly to the pinned level in another breadcrumb path, unpin the pinned level, and navigate through the levels in one of the breadcrumb paths.

Further understanding of the features and advantages of the embodiments described herein may be realized by reference to the remaining portions of the specification and the attached drawings.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other applications without departing from the scope of the embodiments. Thus, the embodiments are not to be limited to those shown, but are to be accorded the widest scope consistent with the principles and features described herein. For purpose of clarity, details relating to technical material that is known in the technical fields related to the embodiments have not been described in detail.

Breadcrumbs are a navigation tool in user interfaces, which allow users to keep track of their location within programs or lists. The breadcrumb identifies a path taken through a hierarchical dataset to reach a selected node. The breadcrumb paths are defined within the hierarchical dataset comprising a plurality of data items that may be organized as levels with a top root node. The levels may be referred to as subordinate items or child nodes. A graphical user interface may be used to display very large hierarchical datasets comprising any number of nodes, however, displaying all of the nodes would be cumbersome for user navigation. Thus, hierarchical datasets may be displayed through a tree in the graphical user interface, in which individual nodes may be opened or closed to show or hide the child nodes contained therein. The hierarchical organization of datasets enables the description of nodes according to respective paths to be traversed to reach them. When a user navigates through a hierarchical dataset, this sequence may be presented as a breadcrumb path identifying the hierarchical series of nodes through which the user navigates to reach a node or level. Navigation within large hierarchical datasets may necessitate many navigational steps including drilling down through many levels of the dataset to reach a desired level. When conventional navigation through breadcrumb paths is used in hierarchical datasets having even a moderately complex structure, the number of individual levels that need to be navigated to may quickly grow to an unmanageable size.

In one example, an administrator may need to edit a setting within multiple breadcrumb paths each associated with an employee. The setting may be multiple levels deep so that each time the administrator selects an employee, the administrator needs to navigate through multiple levels to reach the setting and then repeat the process for each employee. If navigation to the same level needs to be repeated for multiple data updates, the navigation may quickly become cumbersome and very time consuming to the administrator. In another example, a level may need to be pinned for use in viewing or comparing information for two or more data items.

The embodiments described herein provide pinning of a level within a breadcrumb path to allow users to maintain their place in a hierarchy while switching between breadcrumb paths without being taken back to the highest level. Thus, the user may easily switch between the same level within different breadcrumb paths without having to repeatedly navigate through each breadcrumb path. As described below, this feature may be used in conjunction with navigation tools, such as previous and next arrows or other suitable tools. One or more embodiments open up additional options for designing interfaces with complex hierarchies since the burden of repeatedly drilling down to specific levels in a hierarchy is alleviated, thereby reducing the time needed to complete tasks such as changing the same setting in multiple breadcrumb paths. One or more embodiments may be implemented in a desktop application or on a mobile device where there is limited space and drilling down many levels may become very difficult. As described in detail below, a user may select a specific level of a breadcrumb path to navigate within, rather than always being taken back up to the top (first) level of the hierarchy. One or more embodiments provide faster navigation in a complex data hierarchy, and may be particularly useful when making data updates to a large number of entries where the level of focus may depend on a specific update within a breadcrumb path that may be any number of levels deep within the hierarchy.

Figure 1:
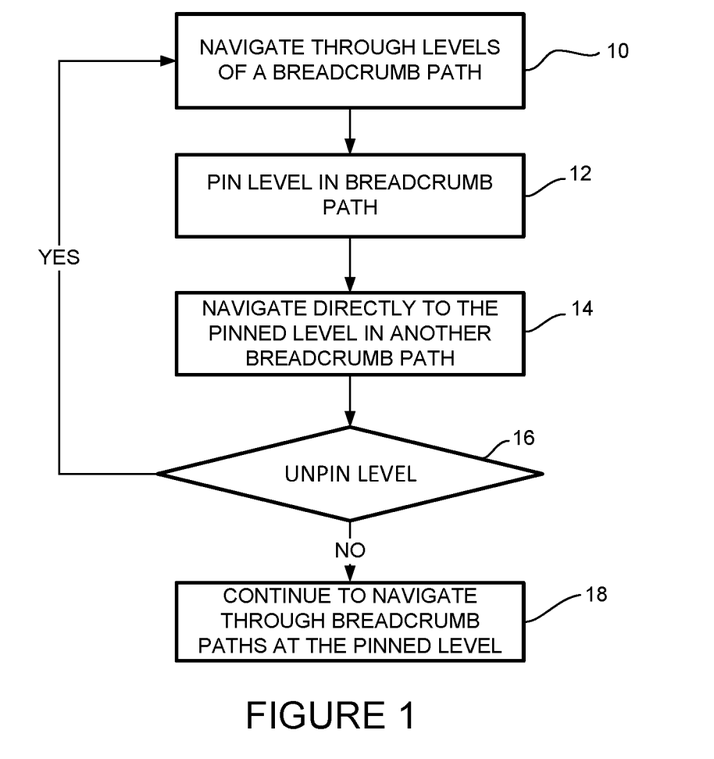
FIG. 1 is a flowchart illustrating an overview of a process for pinning a level in a breadcrumb for use in navigating between breadcrumbs, in accordance with one embodiment.

Referring now to the drawings, and first to FIG. 1, a flowchart illustrating an overview of a process for pinning a level in a breadcrumb path for use in navigating to the same level between breadcrumb paths is shown, in accordance with one embodiment. Navigating and pinning steps (e.g., computer implemented navigation through a dataset) described herein are performed in response to input from a user (e.g., at a graphical user interface), which may comprise selection of one or more interactive items displayed on a computer or mobile device screen. At step 10, navigation is performed sequentially (i.e., from a first (top) level in order) through levels in a first breadcrumb path in a hierarchical dataset comprising a plurality of breadcrumb paths comprising a plurality of the levels. The navigation may be performed in response to user input received at the graphical user interface to direct navigation and pinning, for example. As described below, the graphical user interface facilitates navigation through the breadcrumb path and enables navigation directly to a pinned level in another breadcrumb path. In one or more embodiments, a list of the breadcrumb paths may be displayed without displaying the levels within each of the breadcrumb paths. In one example, the first level is displayed upon selecting one of the breadcrumb paths. In one or more embodiments, the list of breadcrumb paths may be displayed in a primary window and each of the levels displayed in a side panel or pop-up window positioned in a sub-area of the primary window, for example.

One of the levels in the first breadcrumb path is pinned at step 12. As described below, this may comprise receiving input at a pin (or other) icon (e.g., clickable icon associated with a button) of the graphical user interface. In one or more embodiments, the pin icon is displayed at each of the levels except for the first level (top level in the hierarchy for the breadcrumb path), since there is no reason to pin the first level because this is where the user is taken by default when the breadcrumb path is selected. Pinning of the level in the breadcrumb path reduces all of the breadcrumb paths to the pinned level so that navigation to a second breadcrumb path or any other breadcrumb path goes directly to the same level (step 14). Navigation to the same level in a different breadcrumb path may comprise, for example, receiving input at a navigational arrow displayed on the graphical user interface upon pinning the level. In one or more embodiments, the navigational arrows may allow a user to skip any breadcrumb path in the list that does not contain the pinned level. There is no need for a user to navigate sequentially through each of the levels within the breadcrumb path to reach the pinned level, once the level is pinned. The user may jump directly to the pinned level when switching between breadcrumb paths in the hierarchical dataset, as opposed to starting over again at the first (top, highest) level for each breadcrumb path. As described below, breadcrumb paths that do not contain the pinned level may be disabled in the graphical user interface. For example, display of the breadcrumb paths in the list not containing the pinned level may be changed (e.g., faded).

Navigation directly to the pinned level continues while the level is pinned (steps 16 and 18). Input may be received, for example, changing a setting at the pinned level in two or more of the breadcrumb paths before unpinning the level. If the user wants to return to the original navigational hierarchy or pin another level, the pinned level is unpinned (e.g., input received when user selects unpin icon) and navigation continues through the levels of one of the breadcrumb paths (steps 16 and 10). Once the level is unpinned, navigation may be performed sequentially through the levels (forward (down) or backward (up)) within the current breadcrumb path or a new breadcrumb path, in which case the user will be taken to the first (top) level in the new breadcrumb path.

It is to be understood that the flowchart shown in FIG. 1 is only an example and steps may be added, modified, removed, combined, or rearranged, without departing from the scope of the embodiments.

Figure 2:
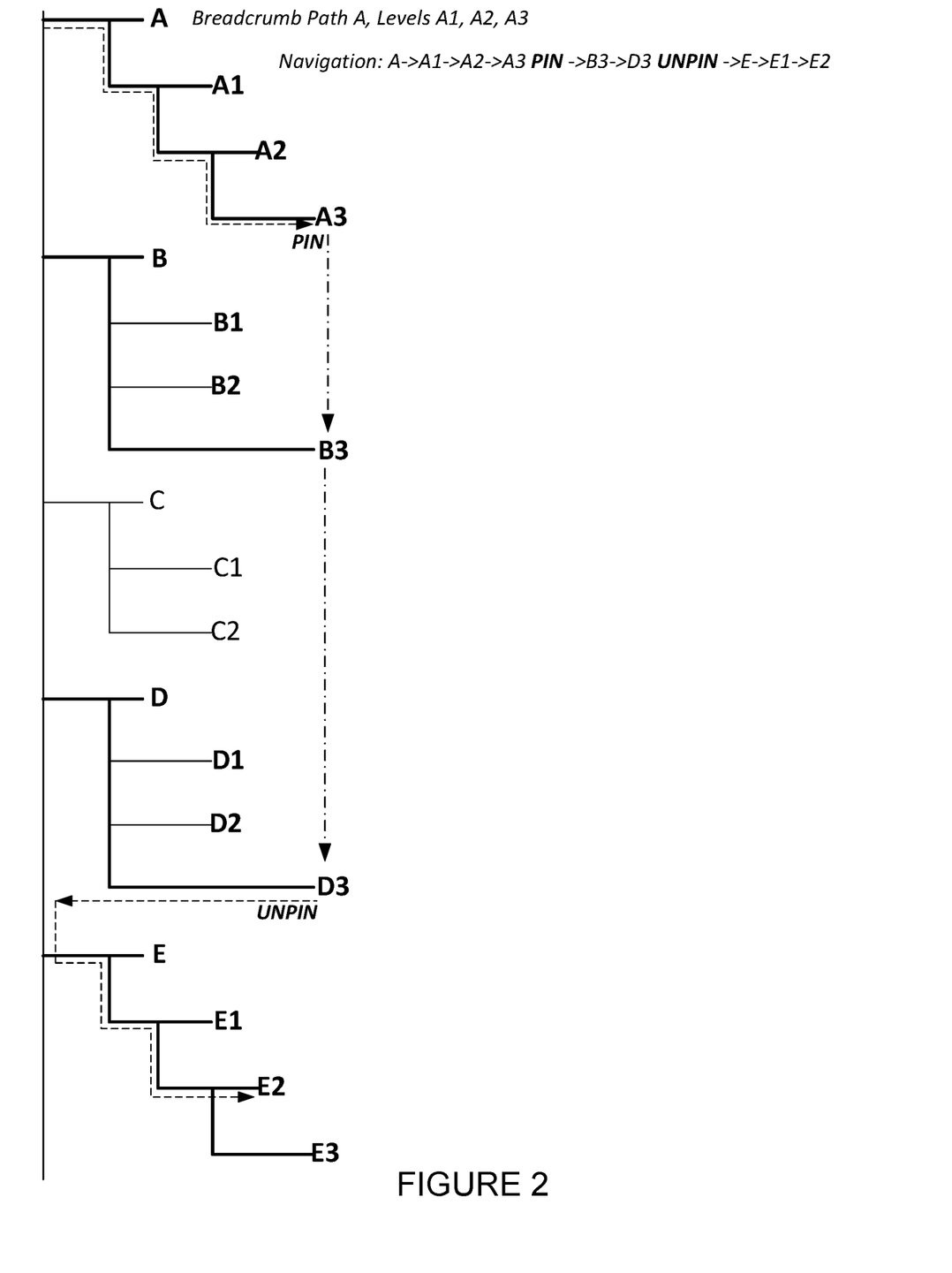
FIG. 2 illustrates an example of navigation between breadcrumb paths with pinning and unpinning of levels, in accordance with one embodiment.

FIG. 2 is a diagram illustrating an example of navigation through breadcrumb paths and pinning of a level in the breadcrumb paths. The simplified hierarchical dataset shown in FIG. 2 includes five items (A, B, C, D, E), each associated with a breadcrumb path. In this example, breadcrumb path A includes three levels A1, A2, and A3, breadcrumb path B includes three levels B1, B2, B3, breadcrumb path C includes two levels C1, C2, breadcrumb path D includes three levels D1, D2, D3, and breadcrumb path E includes three levels E1, E2, E3. It is to be understood that the dataset shown in FIG. 2 is only an example, and the dataset may include any number of items (breadcrumb paths) each containing any number of levels.

In the example shown in FIG. 2, navigation begins at breadcrumb path A and sequentially goes through each of the levels A1→A2→A3 to drill down and reach the third level (A3). Upon reaching level A3, the level is pinned. Once the level is pinned, a user may navigate directly to level 3 within another breadcrumb path without passing through levels 1 and 2. For example, as shown in FIG. 2, navigation continues directly to the third level B3 for breadcrumb path B. As described below, navigation arrows may be displayed on the graphical user interface for use in receiving input for direct navigation to the pinned level between breadcrumb paths. In the example shown in FIG. 2, breadcrumb path C has no level 3, thus navigation continues to the third level D3 of item D. At this point, the level is unpinned at D3 (e.g., in response to input received when unpin icon is selected). The navigation continues to the first level E1 in a new breadcrumb path E and returns to sequential navigation (E1→E2) to reach level E2 (or any other level). The pinning and unpinning of levels may be repeated any number of times within any number of breadcrumb paths.

Figure 3A:
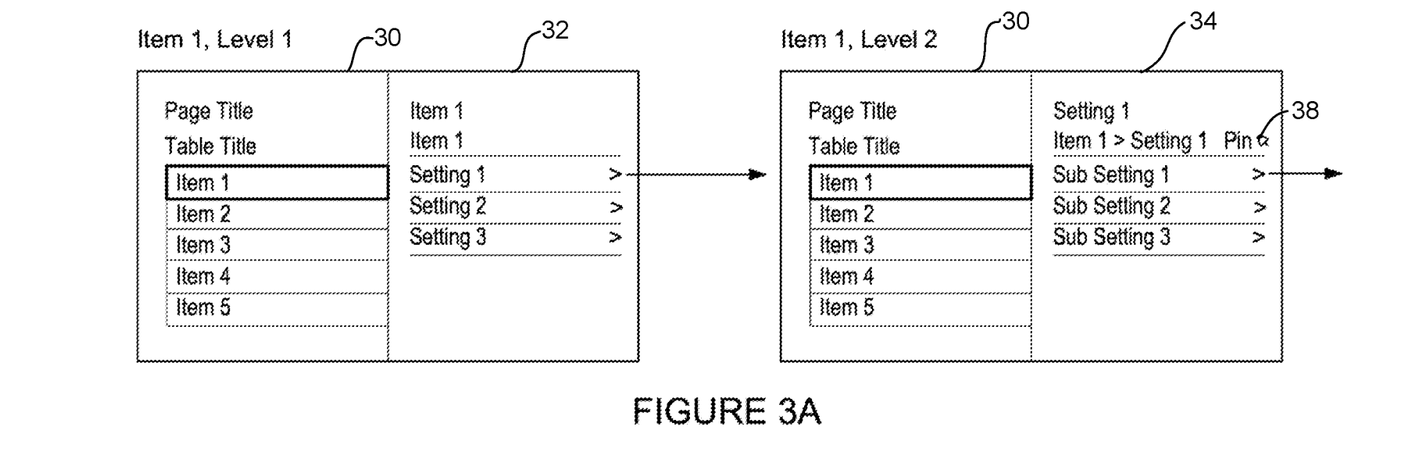
FIG. 3A illustrates navigation flow through levels within a breadcrumb path.
Figure 3B:
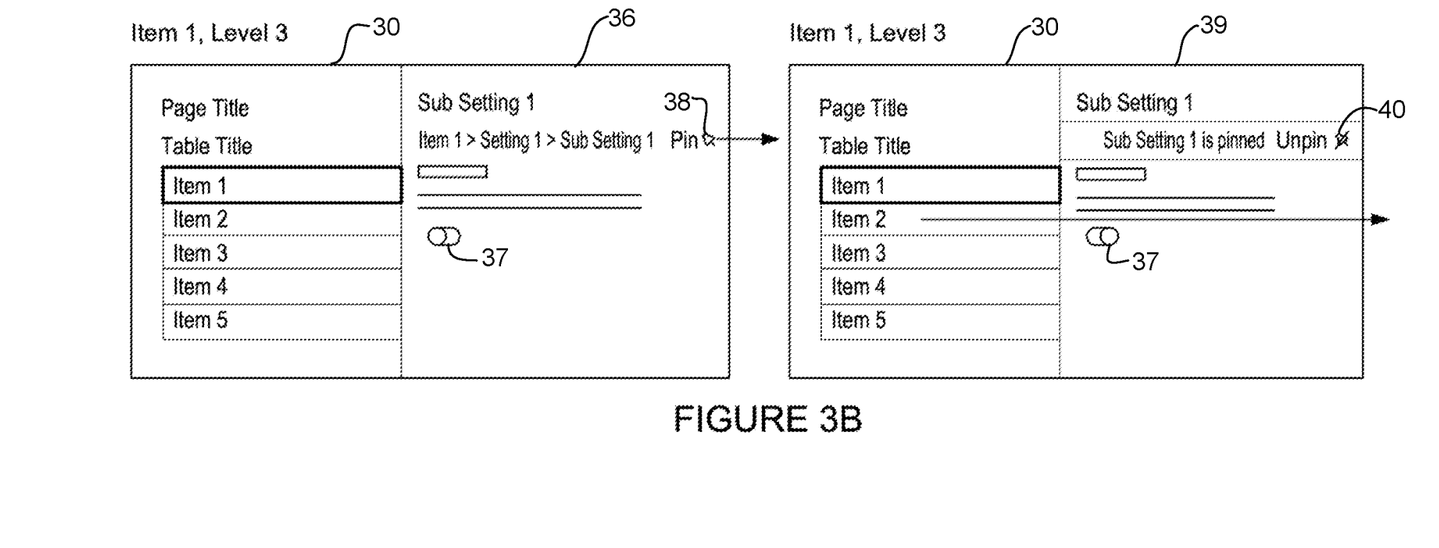
FIG. 3B illustrates pinning of a level within the breadcrumb path.

FIGS. 3A-4B illustrate another navigation example with reference to a simplified graphical user interface, in accordance with one embodiment. A primary window 30 of the graphical user interface is displayed and lists selectable breadcrumb paths (item 1, item 2, item 3, item 4, item 5). When item 1 is selected in the primary window 30, a first level of settings (setting 1, setting 2, setting 3) are displayed in a secondary window 32. The secondary window 32 displays the selectable settings at level 1. Setting 1 is selected and level 2 sub settings (sub setting 1, sub setting 2, sub setting 3) are displayed as shown in the second level window 34 A selectable pin icon 38 is displayed in the level 2 window 34 and each subsequent level window. The selectable items, levels (settings, sub settings), and pin (or unpin) icon may be selected by moving a cursor or mouse over the selectable text or icon and clicking the mouse or using any other suitable input device or mechanism. Sub setting 1 is selected and level 3 settings are displayed in sub setting 1 (third level) window 36 (FIGS. 3A and 3B). In this example, a toggle (on/off) switch 37 is presented that may be used to turn sub setting 1 on or off. The third level (sub setting 1) of item 1 is pinned through interaction with the pin icon 38 in window 36, as shown in FIG. 3B. A special icon may be highlighted or displayed to indicate that the level is pinned. For example, once the level is pinned, an unpin icon 40 may be displayed as shown in window 39 of FIG. 3B. A user may then navigate directly to the same level for different items (breadcrumb paths), as shown in FIG. 4A.

Figure 4A:
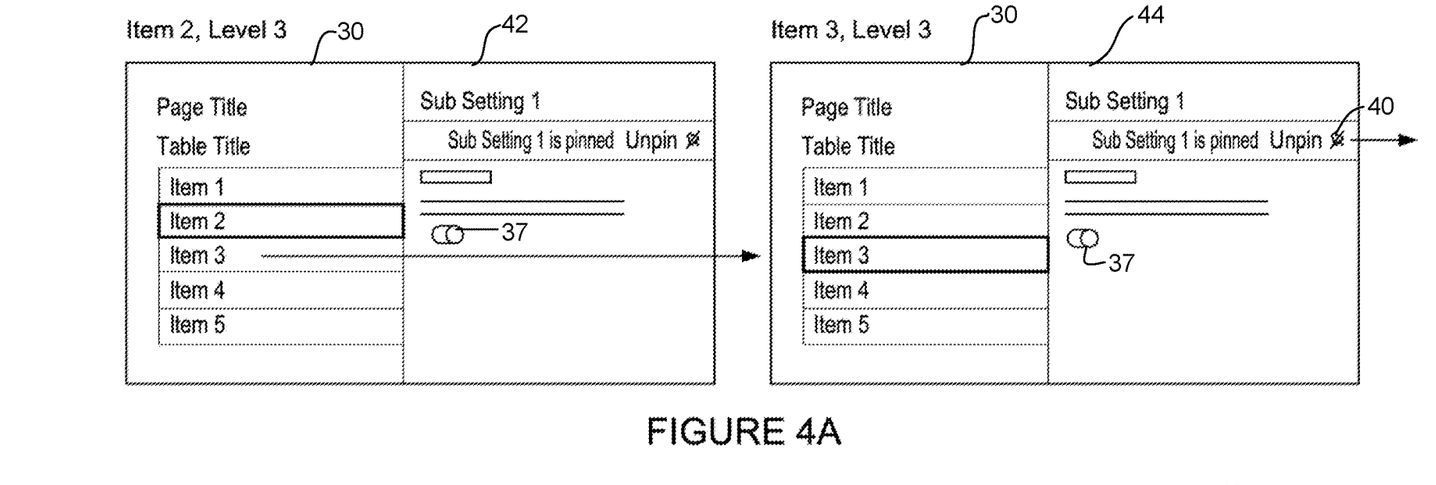
FIG. 4A illustrates navigation between different breadcrumb paths at the pinned level.
Figure 4B:
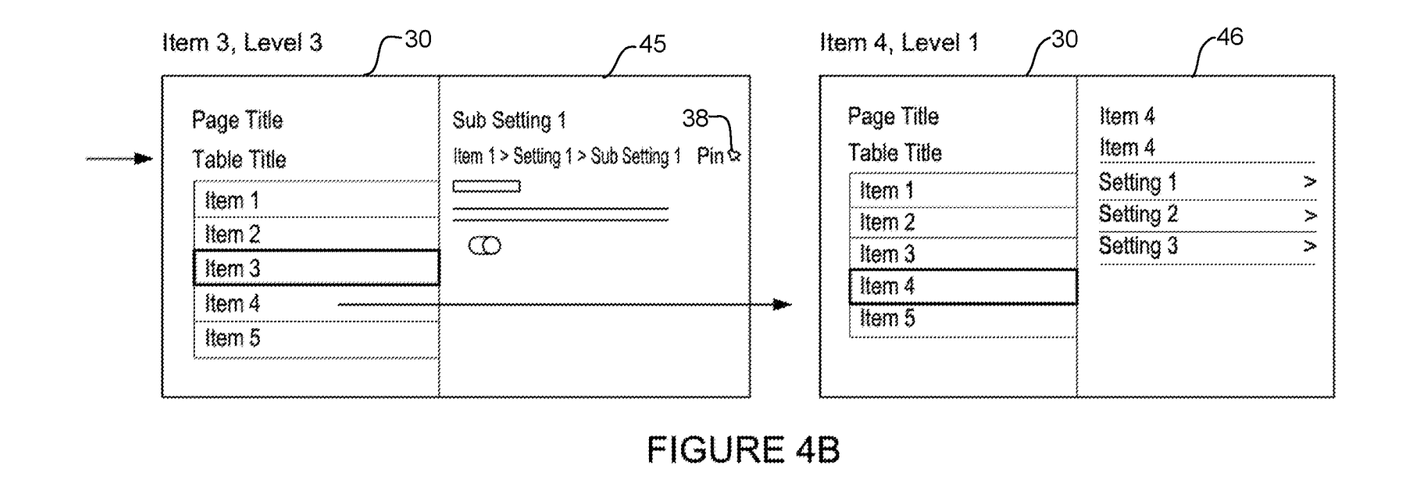
FIG. 4B illustrates returning to previous navigation between the breadcrumb paths after unpinning the level.

FIG. 4A illustrates navigation directly to sub setting 1 (level 3) in window 42 of item 2 and then sub setting 1 (level 3) in window 44 of item 3. This navigation may be used, for example, by a human resource administrator that wants to change sub setting 1 (e.g., toggle switch 37) for a number of employees. Rather than drilling down to the desired level and being brought back up to the top (first) level for each employee, the administrator may move quickly through sub setting 1 for each employee after pinning this level. As shown in window 45 of FIG. 4B, the level is unpinned and navigation to the next item (breadcrumb path) 4 returns to the top (first) level in which setting 1, setting 2, setting 3 are displayed in window 46. Navigation will then continue sequentially through the levels within the breadcrumb path until another level is pinned.

Figure 5:
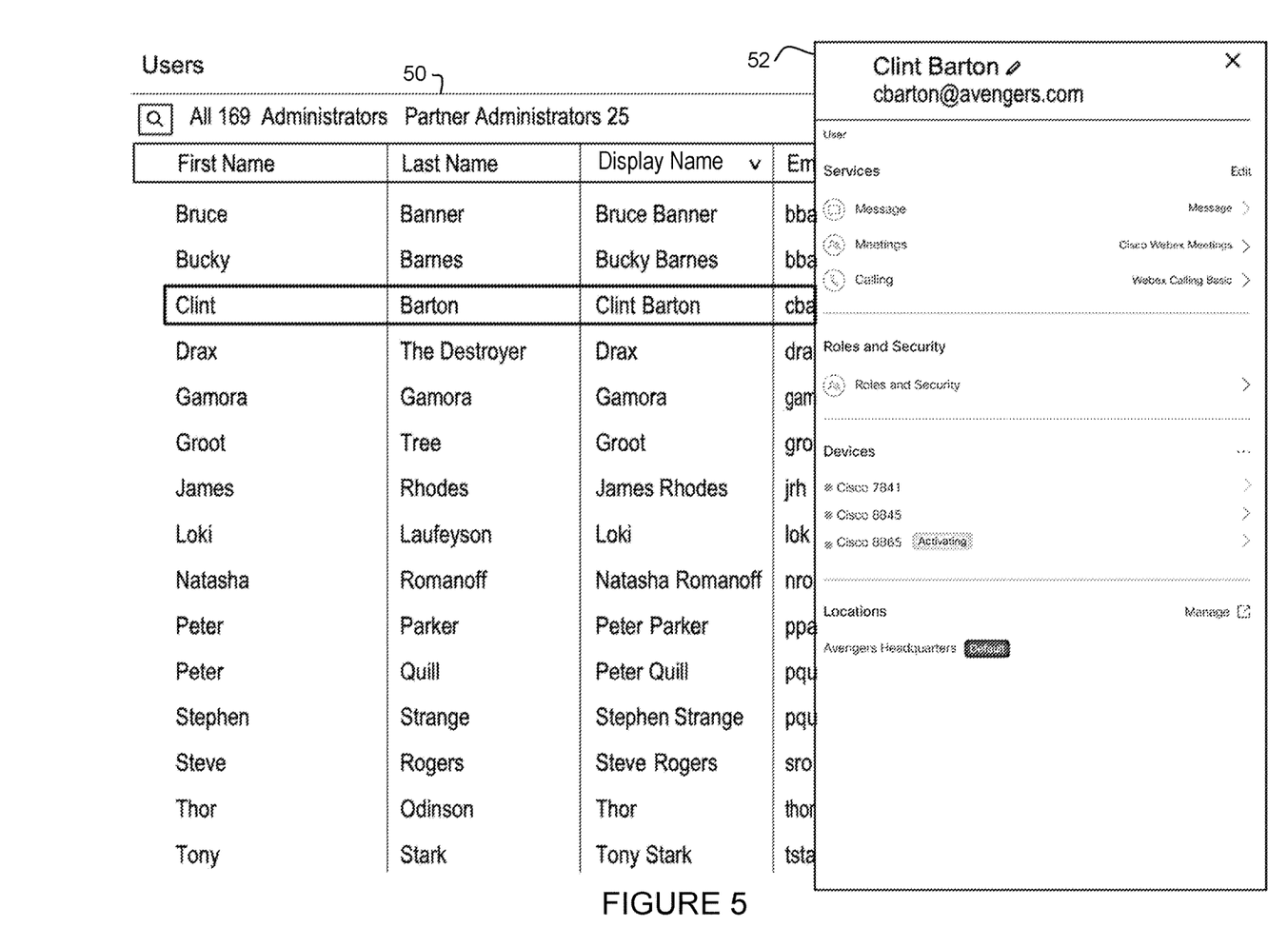
FIG. 5 illustrates an example of a graphical user interface showing a list of breadcrumb paths in a hierarchical dataset and a first level for a selected user.
Figure 6:
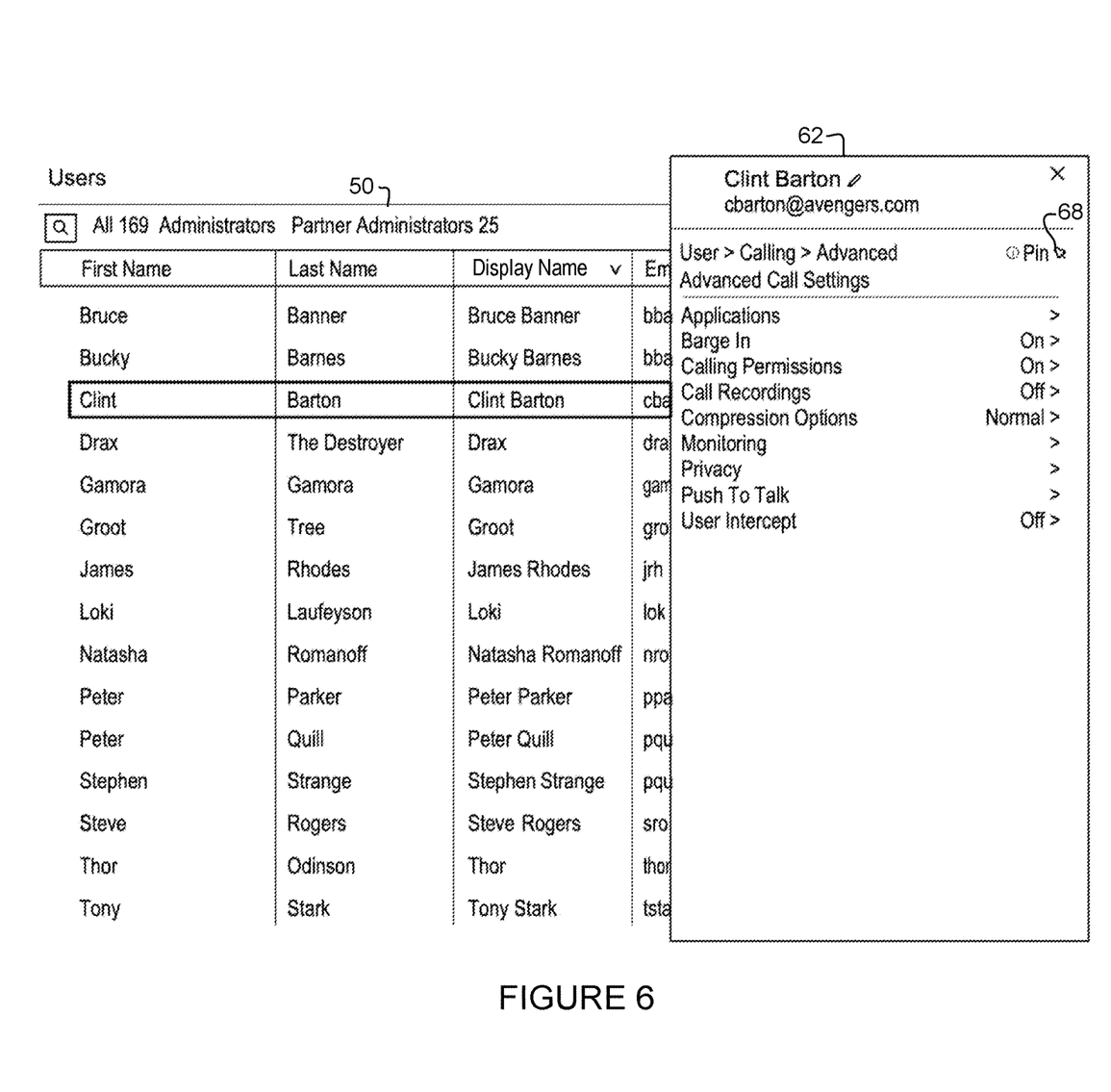
FIG. 6 illustrates a plurality of levels in the breadcrumb path for the selected user shown in FIG. 5.

FIG. 5 illustrates another example of navigation through the use of a graphical user interface, in accordance with one embodiment. In this example, a list of people (users within database) are displayed at 50 (e.g., first name, last name, display name, email). Each person is associated with a breadcrumb path comprising one or more levels, each level comprising one or more settings. In the example shown in FIG. 5, item 3 on the list (Clint Barton) is selected and side panel 52 (display sub-area) appears. The first level includes a number of services that may be selected for editing. In this example, a user selects "Calling" and "Advanced Call Settings" to bring them to a level shown in FIG. 6 at window 62. A pin icon 68 is displayed in window 62 since navigation has moved beyond the first level shown in FIG. 5. In the example shown in FIG. 6, the breadcrumb path that has been navigated through is shown in side panel 62. For simplification, sequential navigation through the higher levels is not shown.

Figure 7:
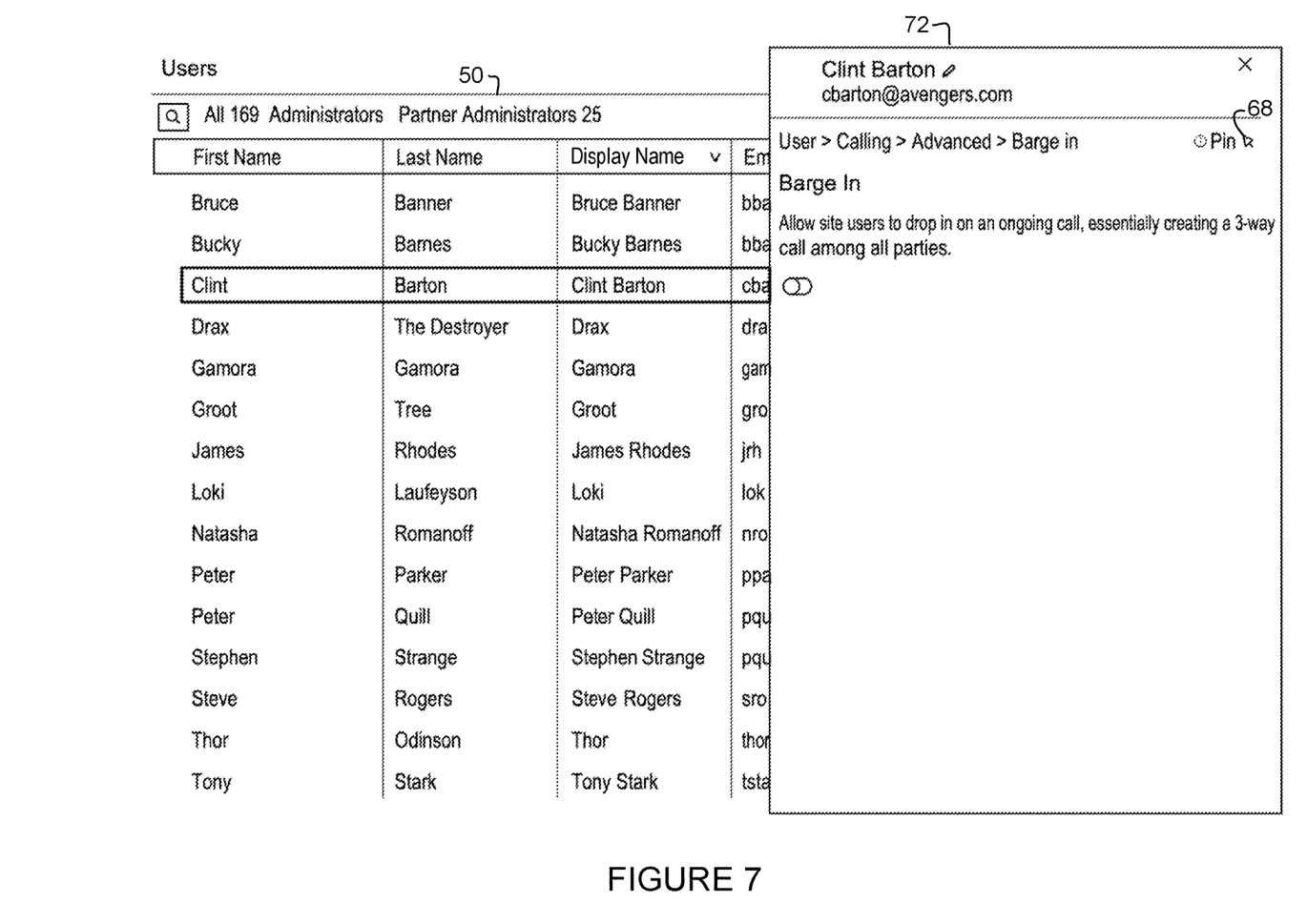
FIG. 7 illustrates navigation to one of the levels shown in FIG. 6.
Figure 8:
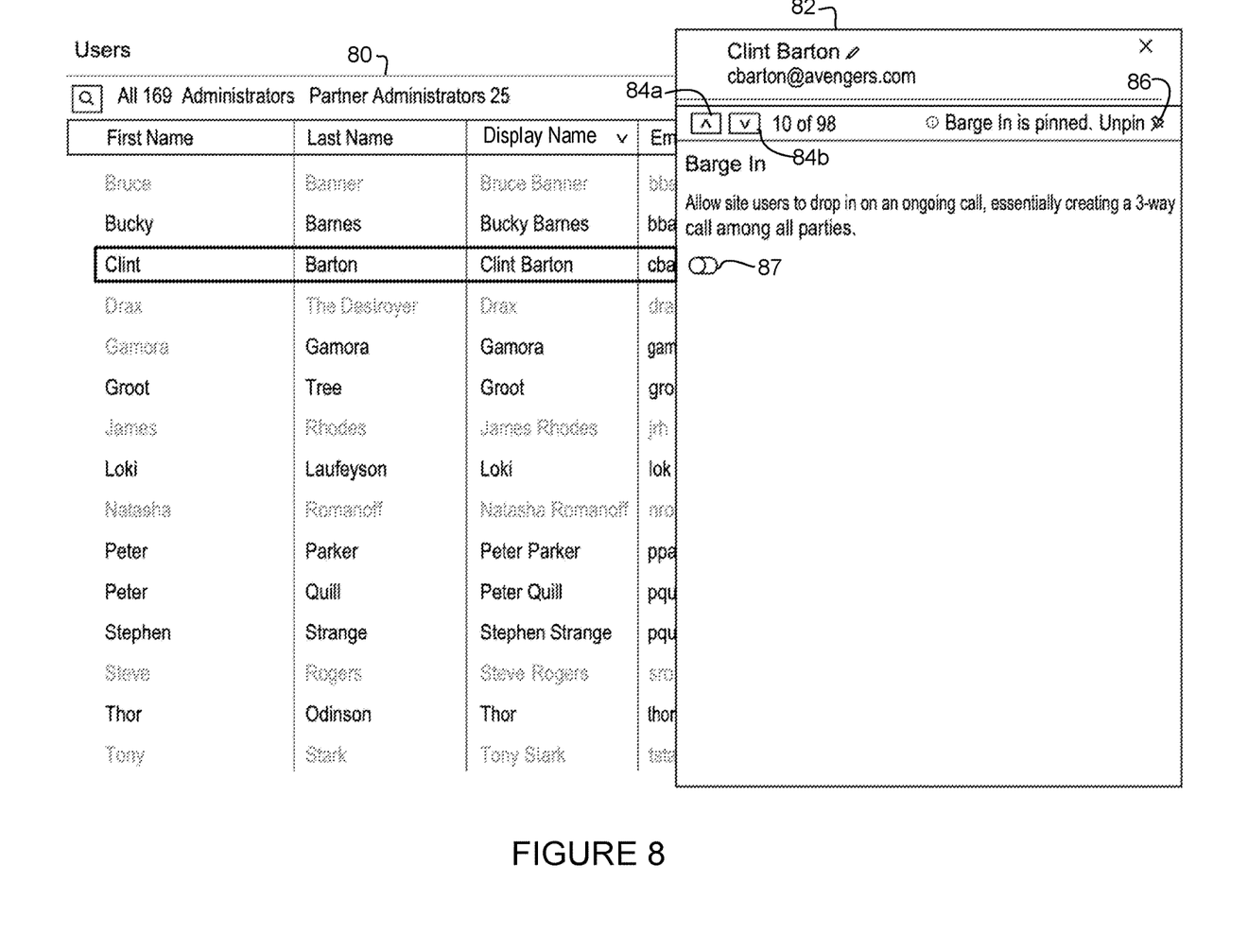
FIG. 8 illustrates pinning of the level shown in FIG. 7.

"Barge In" is selected from the advanced call settings and a new level is displayed in window 72 shown in FIG. 7. The "Barge In" level is pinned using pin icon 68 in FIG. 7 and a new window 82 for the pinned level is shown in FIG. 8. An unpin icon 86 is now displayed in window 82 and the breadcrumb path has been reduced to only the pinned level ("Barge In"). The window 82 also displays navigation arrows 84a (up) and 84b (down) after the level is pinned, which may be used for input to navigate directly to the pinned level in another breadcrumb path. For example, the user may click on (or select) the up arrow 84a or down arrow 84b to provide input for the controller to navigate directly to the "Barge In" setting at another user. As previously noted, once a level is pinned, a display of any breadcrumb path that does not contain the pinned level may be changed. As shown in FIG. 8, once the "Barge In" level is pinned, any person without this setting can no longer be navigated to (or selected) and is faded to indicate that it is disabled. For example, the name Bruce Banner is disabled in window 80 and cannot be navigated to with this level pinned since he does not have a "Barge In" setting.

Figure 9:
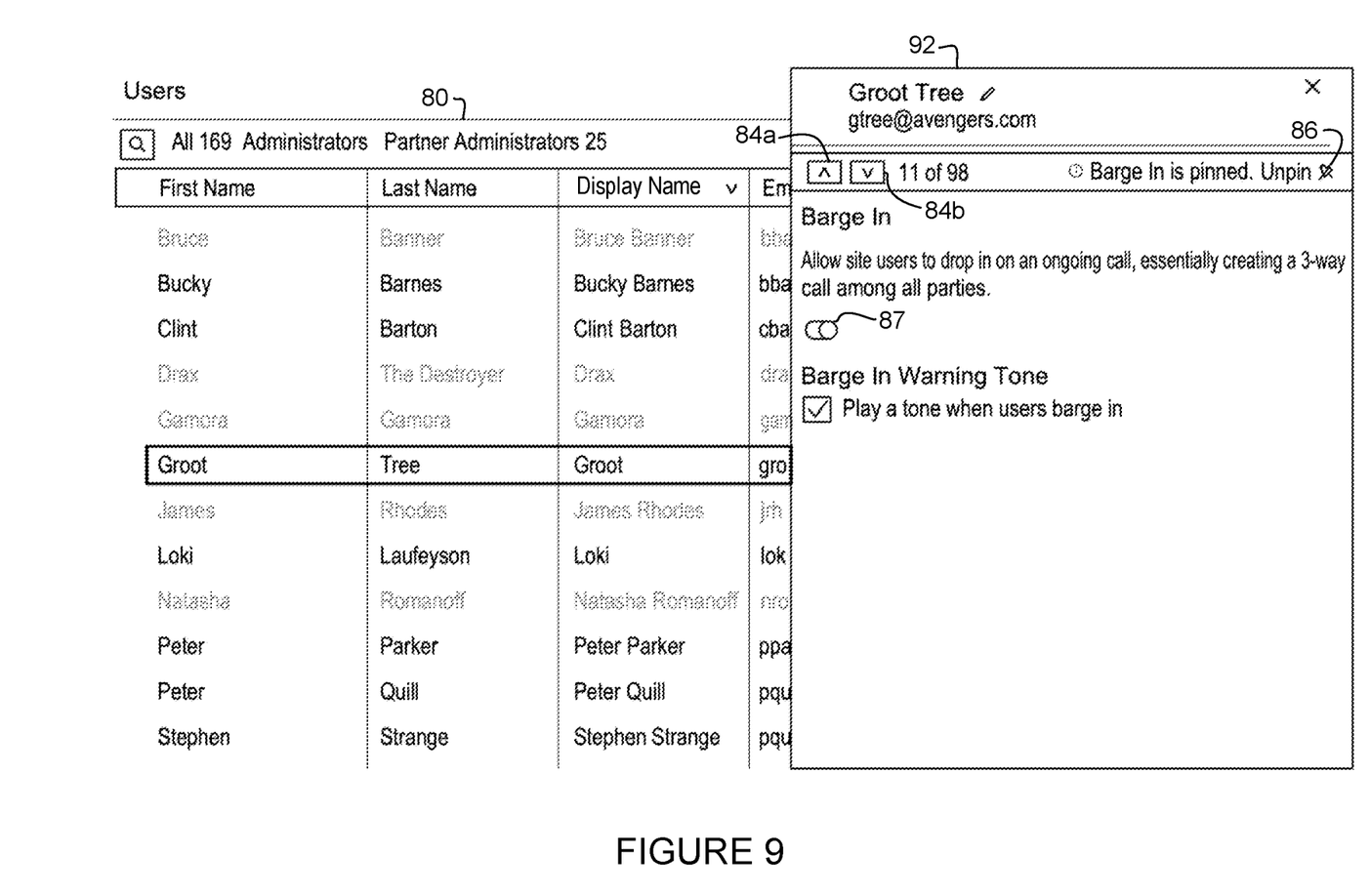
FIG. 9 illustrates navigation between breadcrumb paths at the pinned level of FIG. 8.

FIG. 9 illustrates navigation down to the next person (Groot) with the setting of "Barge In" and directly to that pinned level in side panel 92 without having to navigate through upper levels in the breadcrumb path.

It is to be understood that the graphical user interfaces shown in FIGS. 3A-9 are only examples and other interfaces comprising any type or arrangement of breadcrumb lists, display of levels, or pin/unpin icons, or type of data may be used, without departing from the scope of the embodiments.

Figure 10:
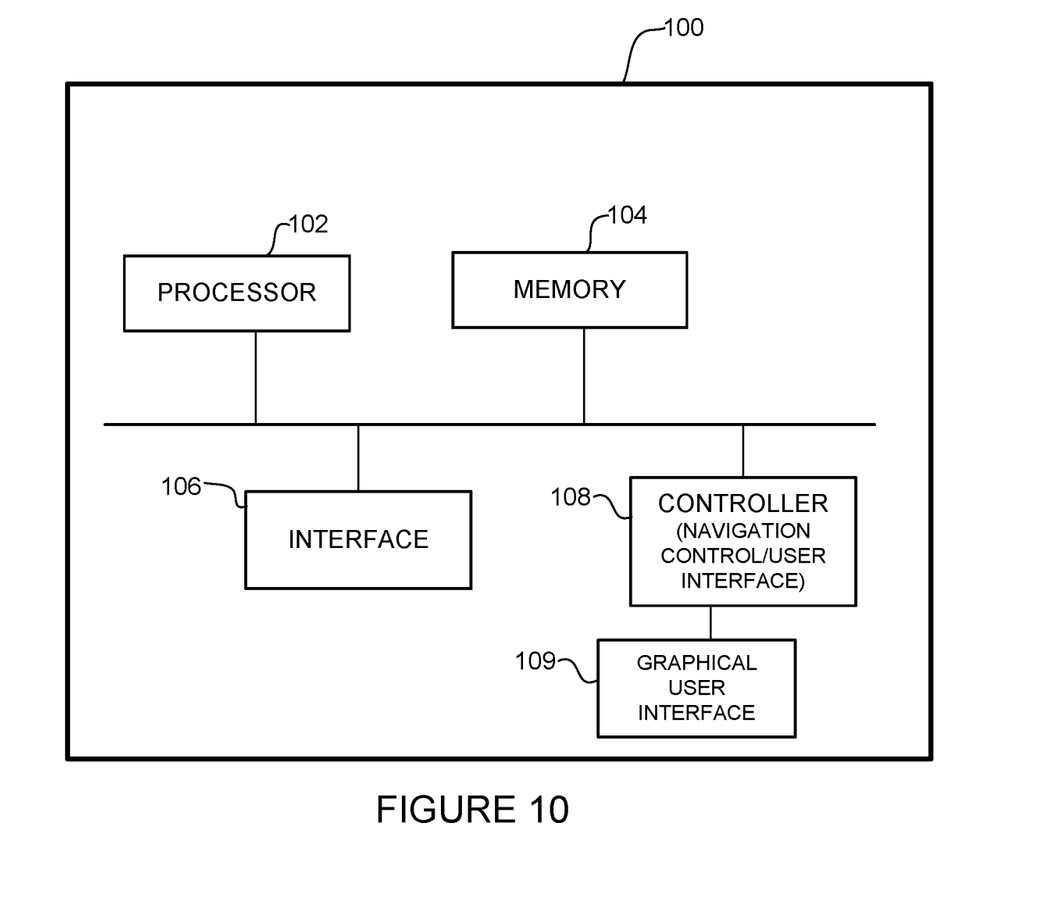
FIG. 10 is a block diagram depicting an example of a device in which the embodiments described herein may be implemented.

FIG. 10 illustrates an example of a device (desktop computer, laptop, mobile device, tablet, handheld device, phone) 100 that may implement the embodiments described herein. In one embodiment, the device 100 is a programmable machine that may be implemented in hardware, software, or any combination thereof. The device 100 includes one or more processor 102, memory 104, interface 106, and a controller (navigation control/user interface) (e.g., code, software, logic, module, device, API (Application Programming Interface)).

In one embodiment, an apparatus comprises memory 104 for storing a hierarchical dataset comprising a plurality of breadcrumb paths comprising a plurality of the levels, a graphical user interface 109 for displaying a list of the breadcrumb paths, and the controller 108 operable to navigate through the levels in one of the breadcrumb paths, pin a level within the breadcrumb path, navigate directly to the pinned level in another breadcrumb path, unpin the level, and navigate to a first level in a new breadcrumb path in response to receiving input at the graphical user interface. As described below, the graphical user interface 109 may be configured for receiving any type of input for use by the controller 108 in navigating through the dataset and any type of output for displaying navigation results.

Memory 104 may be a volatile memory or non-volatile storage, which stores various applications, operating systems, modules, and data for execution and use by the processor. The device 100 may include any number of memory components. Memory 104 may be utilized to store and retrieve software programs incorporating computer code that implements aspects of the embodiments, data for use with the embodiments, and the like.

The hierarchical dataset may be stored in memory 104 at the device 100 or a remote storage location. For example, a mobile device implementing the embodiments described herein may be in communication with a remote network device (e.g., server) containing all or a portion of a database containing the hierarchical dataset.

Logic may be encoded in one or more tangible media for execution by the processor 102. For example, the processor 102 may execute codes stored in a computer-readable medium such as memory 104. The computer-readable medium may be, for example, electronic (e.g., RAM (random access memory), ROM (read-only memory), EPROM (erasable programmable read-only memory)), magnetic, optical (e.g., CD, DVD), electromagnetic, semiconductor technology, or any other suitable medium. In one example, the computer-readable medium comprises a non-transitory computer-readable media for execution and when executed operable to perform one or more functions including steps of the flowchart shown in FIG. 1. The device 100 may include any number of processors 102.

The interface 106 may comprise any number of wired or wireless interfaces for receiving data or transmitting data to other devices, input devices (e.g., touchscreen, mouse, microphone, keypad, or keyboard comprising multiple keys), and output device (display screen, monitor). The keypad may be a touchscreen, which may be integrated with the display and may include numeric keys, alphabetic keys, or any other icons or symbols. The device 100 may include any number of other user interfaces such as one or more manual buttons, mouse, or other user interface. One or more external ports may be provided for connection with another input or output device.

It is to be understood that the device 100 shown in FIG. 10 is only an example and the device may contain any other components or elements operable to implement the embodiments described herein.

Although the apparatus and method have been described in accordance with the embodiments shown, one of ordinary skill in the art will readily recognize that there could be variations made to the embodiments without departing from the scope of the embodiments. Accordingly, it is intended that all matter contained in the above description and shown in the accompanying drawings shall be interpreted as illustrative and not in a limiting sense.

What is claimed is:

1. A method comprising:
   navigating through levels in a breadcrumb path in a hierarchical dataset comprising a plurality of breadcrumb paths comprising a plurality of said levels;
   pinning a level, within the breadcrumb path, for another breadcrumb path, wherein the breadcrumb path and said other breadcrumb path include different top-level nodes;
   navigating directly from said pinned level in the breadcrumb path to said pinned level in said other breadcrumb path, wherein said pinned level in the breadcrumb path is the same level as said pinned level in said other breadcrumb path;
   unpinning said pinned level; and
   navigating through said levels in one of the breadcrumb paths.

2. The method of claim 1 wherein pinning said level within the breadcrumb path comprises receiving input at a pin icon of a graphical user interface, wherein said pin icon is displayed at each of said levels except for a first level.

3. The method of claim 1 wherein navigating directly to said pinned level in said other breadcrumb path comprises receiving input at a navigational arrow displayed on a graphical user interface upon pinning said level.

4. The method of claim 1 further comprising displaying a list of said plurality of breadcrumb paths without displaying said plurality of levels within each of the breadcrumb paths, wherein a first level is displayed upon selecting one of the breadcrumb paths.

5. The method of claim 4 further comprising disabling access to one or more of the breadcrumb paths not containing said pinned level in the list of said plurality of breadcrumb paths.

6. The method of claim 5 wherein navigating directly to said level in said other breadcrumb path comprises skipping said one or more of the breadcrumb paths not containing said pinned level.

7. The method of claim 1 further comprising displaying a list of said plurality of breadcrumb paths in a primary window and wherein each of said levels is displayed in a side panel.

8. The method of claim 1 further comprising receiving input changing a setting at said pinned level in two or more of the breadcrumb paths before unpinning said level.

9. The method of claim 1 further comprising reducing all of the breadcrumb paths to said pinned level.

10. An apparatus comprising:
    memory for storing a hierarchical dataset comprising a plurality of breadcrumb paths comprising a plurality of levels;
    a graphical user interface for displaying a list of the breadcrumb paths; and
    a controller operable to:
    navigate through said levels in one of the breadcrumb paths,
    pin a level, within the one of the breadcrumb paths, for another breadcrumb path, wherein the breadcrumb path and said other breadcrumb path include different top-level nodes,
    navigate directly from said pinned level in the breadcrumb path to said pinned level in said other breadcrumb path, wherein said pinned level in the breadcrumb path is the same level as said pinned level in said other breadcrumb path, and
    unpin said pinned level, in response to input received at the graphical user interface.

11. The apparatus of claim 10 wherein the controller is operable to receive input at a pin icon displayed by the graphical user interface at each of said levels except for a first level.

12. The apparatus of claim 10 wherein the controller is operable to receive input at a navigational arrow displayed on the graphical user interface when said level is pinned.

13. The apparatus of claim 10 wherein the controller is operable to change a display of at least one of the breadcrumb paths in said list not containing said pinned level.

14. The apparatus of claim 10 wherein the graphical user interface comprises a primary window for displaying the list of the breadcrumb paths and wherein each of said levels is displayed in a side panel positioned in a sub-area of said primary window when a level is selected.

15. The apparatus of claim 10 wherein the controller is operable to reduce all of the breadcrumb paths to said level.

16. Logic encoded on one or more non-transitory computer readable media for execution and when executed operable to:
   navigate through levels in a breadcrumb path in a hierarchical dataset comprising a plurality of breadcrumb paths comprising a plurality of said levels;
   pin a level, within the breadcrumb path, for another breadcrumb path, wherein the breadcrumb path and said other breadcrumb path include different top-level nodes;
   navigate directly from said pinned level in the breadcrumb path to said pinned level in said other breadcrumb path, wherein said pinned level in the breadcrumb path is the same level as said pinned level in said other breadcrumb path;
   unpin said pinned level; and
   navigate through said levels in one of the breadcrumb paths.

17. The logic of claim 16 further operable to display a list of said plurality of breadcrumb paths without displaying said plurality of levels within each of the breadcrumb paths, wherein a first level is displayed upon selecting one of the breadcrumb paths.

18. The logic of claim 16 further operable to reduce all of the breadcrumb paths to said level.

19. The logic of claim 16 further operable to receive input at a graphical user interface to direct navigation and pinning.

20. The logic of claim 16 further operable to display arrows on a graphical user interface upon pinning said level for use in receiving input for directly navigating to said pinned level.

* * * * *